United States Patent Office 3,366,378
Patented Jan. 30, 1968

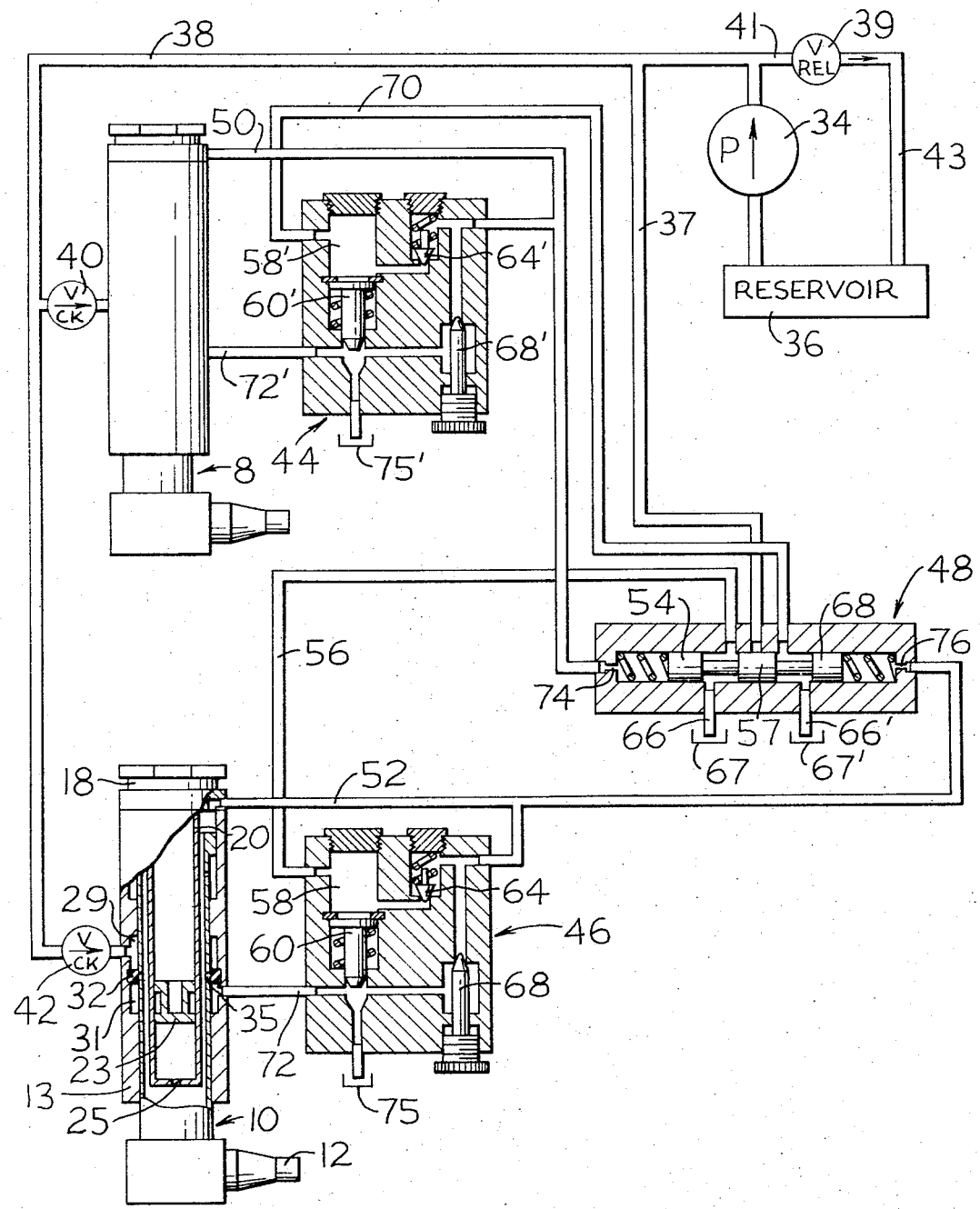

3,366,378
CONTROL SYSTEM FOR VEHICLE SUSPENSION
AND HEIGHT CONTROL APPARATUS
Charles C. Sons, Jr., Peoria, Ill., assignor to Caterpillar
Tractor Co., Peoria, Ill., a corporation of California
Filed Jan. 19, 1966, Ser. No. 521,575
4 Claims. (Cl. 267—64)

This invention relates to an overriding control system for use with level-ride vehicle suspension systems. The invention is particularly suited for use with level-ride air-oil vehicle suspension systems such as that disclosed, for example, in assignee's United States Patent No. 3,128,089 to Burris, Gerber and Sons.

In general, level-ride air-oil suspension systems provide a shock absorbing support whereby the suspended part of the vehicle is maintained at a constant distance above the ground, regardless of variations in weight resulting from loading of the vehicle. In the past level-ride suspensions have been primarily associated with highway-type vehicles where the possibility of underloading an individual suspension to the point where the associated wheel would be pulled free of the ground is remote. However, when the vehicle must operate both on and off highway or off highway exclusively, the need arises to provide an override control for the level-ride suspension.

Thus, air-oil suspensions with position sensitive leveling features as shown in the strut of U.S. 3,128,089 are at a disadvantage when used in off-highway vehicles because when standing on uneven ground, the rigidity of the frame and the designed level-ride operation of the individual strut will cause at least one wheel to be lightly loaded or not loaded at all. As an example, if a 4-wheel vehicle were crossing a ditch at an angle, the front wheel on one side and/or the rear wheel on the opposite side could be pulled completely free of the ground by the action of the level-ride system. In the case of the rear wheel, if a no-spin differential is not installed the rear wheel would spin out, immobilizing the machine.

It is an object of the present invention to provide a level-ride vehicle suspension system with an overriding control to prevent individual wheels from losing traction due to operation of the level-ride feature when the vehicle is operating over rough terrain, etc.

Another and more specific object of this invention is to provide a level-ride air-oil vehicle suspension system with a hydraulic overriding control system which is sensitive to decreasing pressure in a strut load chamber as the strut is unloaded.

A further object of the invention is to provide the instant control system with time-delay means for preventing random blocking out of the level-ride feature as when the vehicle is operating over a bumpy road surface.

The means by which the foregoing and other objects and advantages are obtained are set forth in the following specification wherein reference is made to the accompanying drawing illustrating a preferred embodiment of the invention.

The drawing illustrates the control circuitry for the right front strut 8 and right rear strut 10 of a 4-wheel vehicle equipped with a level-ride suspension system.

The specific details of the suspension and height control system are not the subject of the instant invention, and are fully disclosed in U.S. Patent No. 3,128,089. However, a brief summary of the operation of the said system is included in this application with reference to the right rear strut 10.

The strut 10 is rigidly connected with a vehicle wheel (not shown) through its spindle 12. The strut 10 is mounted for vertical reciprocable motion with respect to a cylinder 13 which is rigidly secured to the vehicle body. The cylinder is provided with a head or cover 18 for supporting a downwardly extending cylindrical gas chamber 20 which projects into the hollow interior of the strut 10 in spaced relation thereto. The gas chamber 20 has a floating piston 23 therein, the space above which is charged with gas under pressure. The space below the floating piston 23 as well as all of the space in the bore of the strut 10 not occupied by the gas chamber and the space in cylinder 13 above the strut are all charged with liquid which is usually oil.

With the construction above described, the weight of the vehicle is in effect supported on air or compressible gas such as nitrogen and as the cylinder 13 descends under the influence of weight or the piston 10 rises when the wheel encounters an obstruction in the terrain, oil in the upper part of the cylinder is forced downwardly between the gas chamber and bore of the strut and then upwardly in the space below the floating piston 23, the upward movement of which is reacted by the compressible gas. The lower end of the cylinder 20 which contains the gas chamber, is preferably provided with a closure having a restricting orifice 25 therein to damp the flow of oil toward and away from the floating piston 23.

Self-leveling or height control is accomplished by adding more liquid to the mechanism when weight in the body of the vehicle moves the cylinder 13 downwardly from the normal position illustrated and permitting liquid to escape therefrom when, upon absence of weight, the expansion of gas in the chamber 20 causes the cylinder 13 to rise. Additional liquid from a pressure source such as pump 34 which takes suction from a reservoir or tank 36 is introduced through a conduit 38 and through a check valve 42 into an annular space 29 which surrounds the strut 10. Liquid is exhausted through a conduit 72 which communicates with a reservoir 75 of the lower portion of a valve block which will be described in greater detail infra. A seal member 32 between the cylinder 13 and strut 10 separates the annular spaces 29 and 31 and in the normal position illustrated closes a plurality of orifices 35 in the wall of the strut which communicate with the main body of liquid in the system. When the load in the vehicle is increased moving the cylinder 13 downwardly, the orifices 35 communicate with the space 29 and liquid under pressure is admitted to the system through the conduit 38. The addition of liquid continues until the cylinder 13 is returned to its normal position and the seal 32 closes the orifices 35. On the other hand, when a load is removed from the vehicle, the cylinder 13 rises until orifices 35 communicate with space 31 permitting liquid to escape through conduit 72 and this continues until the escape of liquid permits return of the cylinder 13 to the normal position where the orifices 35 are again closed by the seal 32.

It is to be understood that the strut 8, provided with a check valve 40, operates in a manner identical to that previously described with respect to strut 10. When the struts 8 and 10 are in the level-ride position and no oil is needed, pressure fluid from conduit 38 communicates with a relief valve 39 via conduit 41 and is relieved to the reservoir 36 via conduit 43. The preceding description relates entirely to the level-ride operation of struts 8 and 10 which are substantially identical to that shown in U.S. 3,128,089.

To provide a means of overriding the level-ride feature of the struts 8 and 10 under conditions of unequal loading as when one wheel or the other might be pulled free of the ground, override valves 44 and 46 and sensing valve 48, along with the appropriate hydraulic circuitry, are included on each side of the vehicle between the front and rear struts to effect the necessary corrective action. Oil pressure in the support chambers of struts 8 and 10 is communicated to sensing valve 48 through conduits 50 and 52, respectively.

In the event that the wheel associated with strut 10 passed over a depression that would cause a reduction in its load and hence a reduced pressure in conduit 52 as compared to the pressure in conduit 50 from strut 8, the higher pressure in conduit 50 would act on the lefthand surface of spool member 54 in valve 48 to urge it rightwardly and communicate a pump pressure conduit 37 with a conduit 56 and thence to a chamber 58 in valve 46. Pressure in chamber 58 urges a spring-biased piston 60 downwardly to block line 72 from the strut thus preventing any transfer of oil from the strut to the reservoir 75. This same pressure also causes the spring biased check valve 64 to move upwardly thereby communicating fluid pressure to the head end of the strut 10 via conduit 52. This latter action causes strut 10 to extend, overriding the level-ride feature until the ground pressure of the wheels, and hence the pressures as sensed in conduits 50 and 52 become equal, at which time spool member 54 will center in its stroke so that spool member 57 effectively blocks fluid communication between conduits 37 and 56. When this balance is reached, oil pressure in conduit 56 will be relieved through conduit 66 to a reservoir 67 and piston 60 will be urged upwardly by its spring to permit normal escape of oil through conduit 72 to the reservoir 75. At this juncture the normal level-ride operation associated with the struts 8 and 10 is resumed.

In the event that the load on strut 8 is reduced, the resultant low pressure in conduit 50, as compared to the pressure in conduit 52, will urge the spool member 68 to the left to communicate fluid pressure from conduit 37 to the valve 44 via conduit 70 to override the level-ride feature of strut 8. Valve 44 is identical in construction and operation to valve 46 and prime numerals (') have been assigned to components of valve 44 corresponding to the reference numerals associated with the valve 46 which were previously described.

The valves 68 and 68' are the same as the valve noted at 37 in U.S. 3,128,089 and form no part of the instant invention. As fully described in U.S. 3,128,089, the said valves 68 and 68' are provided to facilitate measurement of the gas precharge in the gas chambers of the struts.

One further aspect of the invention relates to the reduced diameter metering orifices formed at each end of the sensing valve 48 as shown at 74 and 76. It has been found that some time delay means should be incorporated in the overriding control system to prevent random blocking out of the level-ride feature of the struts 8 and 10 as when the vehicle might be operating over a bumpy road surface. The incorporation of metering orifices 74 and 76 where the lines 50 and 52 enter the sensing valve 38 provides a time delay of several seconds to permit normal spring action of the level-ride suspension system under such conditions.

The above described control system makes it possible for a level-ride suspension system, such as that shown in U.S. 3,128,089, to be used advantageously on vehicles regardless of the terrain encountered. Thus, the normal level-ride action is permitted when operating the vehicle over comparatively smooth road surfaces with the override control eliminating any possibility of extreme load variations between individual wheel suspensions when operating over uneven road surfaces.

I claim:

1. In a level-ride liquid suspension system for the load supporting wheel struts of a multi-wheeled vehicle including a source of pressure fluid and means for introducing said fluid under pressure to said struts to compensate load and thereby maintain the vehicle at a constant elevation relative to the ground, means for overriding the leveling function when one of the wheels is unsupported relative to the ground for a predetermined time period, said overriding means comprising means responsive to reduced pressure in the strut of said wheel for temporarily introducing pressure from said source to said strut.

2. A liquid suspension system as set forth in claim 1 wherein said pressure responsive means comprises a valve which is in fluid communication with at least two wheel struts located on the same side of the longitudinal axis of said vehicle.

3. A liquid suspension system as set forth in claim 2 wherein said valve comprises movable pressure sensitive means having a first member in fluid communication with a first wheel strut, a second member operatively associated with said first member and in fluid communication with a second wheel strut, and at hird member operable upon movement of said first and second members to selectively communicate pressure fluid from said source to either said first or second wheel struts.

4. A liquid suspension system as set forth in claim 3 wherein said valve is provided with reduced diameter metering orifices in the fluid communications between said first and second members and said first and second wheel struts, respectively.

No references cited.

ARTHUR L. LA POINT, *Primary Examiner.*

R. M. WOHLFARTH, *Assistant Examiner.*